Aug. 22, 1961  J. R. GAINES ET AL  2,997,136
HANDICAPPING DEVICE FOR RACING SULKIES
Filed Dec. 31, 1956  2 Sheets-Sheet 1

Inventors
John R. Gaines
Clarence F. Gaines
Chester C. DePew
William J. Carry
BY Shoemaker & Mattare
ATTYS Aug. 22, 1961    J. R. GAINES ET AL    2,997,136
HANDICAPPING DEVICE FOR RACING SULKIES
Filed Dec. 31, 1956    2 Sheets-Sheet 2

Inventors
John R. Gaines
Clarence F. Gaines
Chester C. De Pew
BY William J. Carry
Shoemaker & Mattare
ATTYS

United States Patent Office 2,997,136
Patented Aug. 22, 1961

2,997,136
HANDICAPPING DEVICE FOR RACING SULKIES
John R. Gaines, Sherburne, N.Y., Clarence F. Gaines, Box 277, Sherburne, N.Y., Chester C. De Pew, Farmingdale, N.Y., and William J. Carry, Norwich, N.Y.; said John R. Gaines, said De Pew, and said Carry assignors to said Clarence F. Gaines
Filed Dec. 31, 1956, Ser. No. 631,963
8 Claims. (Cl. 188—17)

This invention relates to handicapping devices for racing sulkies and pertains more particularly to mechanism for effecting a constant frictional drag in resistance to the rotation of sulky wheels during a race and by so doing, imposing a handicap upon the horse drawing the sulky.

Ordinarily, racing sulkies are attached to the horse in such a manner that the sulky and its driver are balanced and impose substantially no weight upon the horse's back. It is the usual practice in saddle racing, of course, to provide handicapping and it is a primary object of this invention to provide an equivalent system in sulky racing.

Another object of this invention is to provide a means for handicapping horses in sulky races by establishing a constant frictional drag resisting the rotation of the sulky wheels and to provide this means in such a form as to be easily changeable to vary the amount of handicap imposed.

Still another object of this invention is to provide a means for handicapping horses in sulky races which incorporates a device rotated in response to rotation of the sulky wheels and bearing thereagainst and including mechanism resisting rotation of the sulky wheels to impose a constant frictional drag thereupon.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

Figure 1:
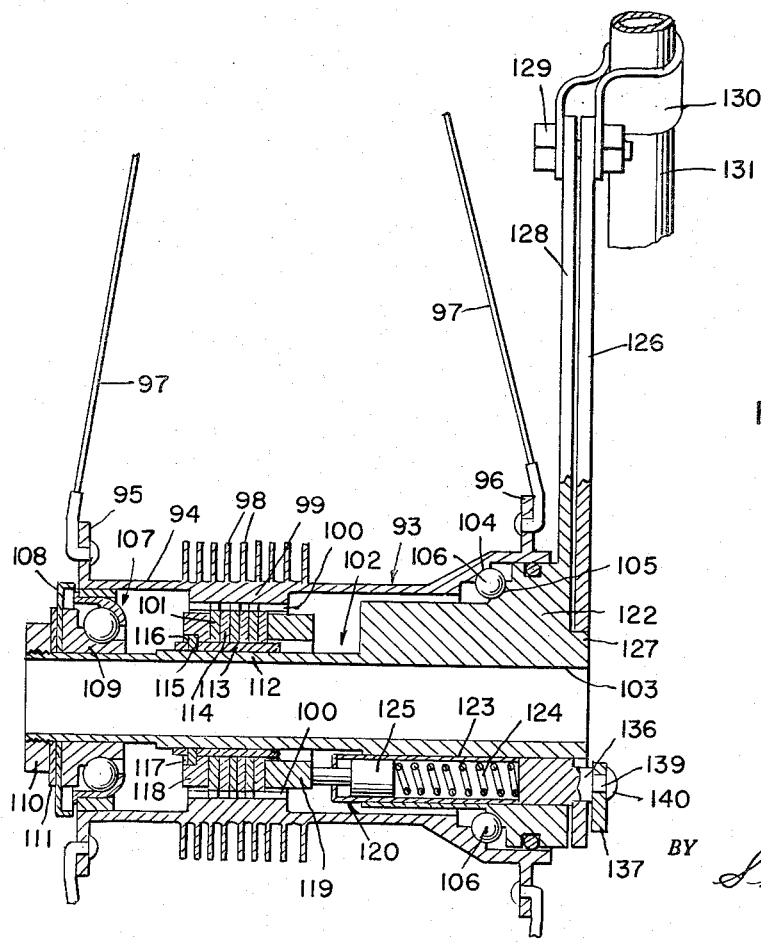
FIG. 1 is a transverse sectional view taken through a sulky wheel hub particularly constructed and arranged to incorporate therein a handicapping device constructed in accordance with one embodiment of the present invention.
Figure 2:
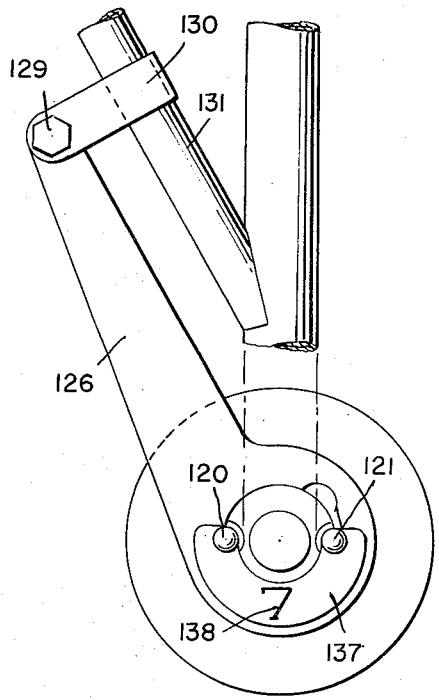
FIG. 2 is a side elevational view of the assemblies shown in FIG. 1 and illustrating the manner in which the handicapping device may be quickly changed to alter the characteristics thereof.
Figure 3:
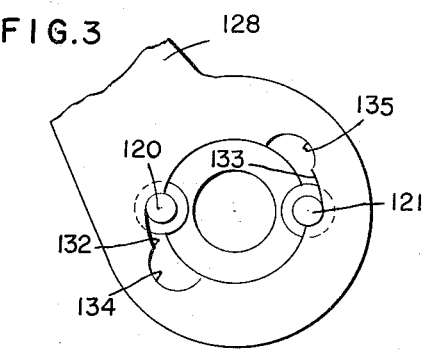
FIG. 3 is a view similar to FIG. 2 but showing the drag link in position after the retaining clip plate has been removed.

Referring now more particularly to the drawings, FIGS. 1, 2 and 3 illustrate one embodiment of the handicapping device for racing sulkies, the hub portion for a wheel thereof and a portion of the frame being illustrated and in these figures the reference character 93 generally designates a cover for the hub portion of the sulky wheel. This cover is of special form and incorporates a cylindrical casing body portion 94 having the radially extending flanges 95 and 96 adjacent its opposite ends suitably apertured to receive the corresponding ends of associated spokes 97. Intermediate the ends of the body portion 94 are formed a series of radially outwardly projecting heat dissipating fins 98 and the body is thickened in this area as illustrated by the reference character 99 and is internally splined to present a series of longitudinally extending spaced ribs 100. These ribs 100 cooperate with peripheral notches formed in a series of friction discs 101 and serve to lock these friction discs to the hub casing 94 but permit longitudinal movement of the discs with respect to the casing for a purpose which will be presently apparent.

Extending through the casing body 94 is the hub or hub mounting portion 102 which is provided with a centrally located longitudinal bore 103 to receive the usual axle which supports the wheel, the member 102 serving to rotatably mount the hub body 94 and for this purpose, opposed portions 104 and 105 of the casing 94 and hub portion 102 respectively are formed so as to provide raceways for the ball bearing elements 106 which are interposed therebetween. At the opposite ends, the ball bearing assembly indicated generally by the reference character 107 is interposed between the inner surface of the casing 94 and the hub portion 102 as is clearly shown. To protect both the ball bearing assembly 107 and the interior of the casing 94, a dust guard 108 is disposed over the projecting end of the member 102 and is retained thereon together with the inner race 109 of the ball bearing assembly 107 by means of a suitable nut 110 and associated washer 111.

The intermediate portion 112 of the hub portion 102 is provided with a series of longitudinally extending and circumferentially spaced lands or ribs 113 which project into notches formed on the inner radius of a series of friction plates 114 which are related to the previously mentioned friction plates 101 in the manner shown. A circumferential groove or notch 115 is cut through the various ribs 113 and receives a C-shaped retaining ring 116 which is disposed within a recess 117 of a backing ring member 118 serving to limit axial movement of this ring to the left in FIG. 1.

Engaging on the other side of the series of friction washers 101, 114, is a pressure ring member 119. A pair of diametrically disposed pressure applying assemblies 120 and 121 are carried by an enlarged end part 122 of the hub portion 102 and engage against the pressure ring 119 and urge it in a direction to the left in FIG. 1 so as to interengage and sandwich the various friction discs 101, 114 between it and the backing ring 118 serving to produce a constant frictional drag upon the hub casing 94 as the same is rotated with the wheel. Each pressure applying assembly is of generally elongated cylindrical configuration to provide a casing 123 within which is disposed a compression spring 124 and a plunger 125, the plunger having a reduced end portion which projects outwardly from the casing 123 and into engagement with the pressure ring 119. Since it is desirable to alter the particular drag produced in accordance with the particular handicap desired to be attained, the pressure applying members 120 and 121 are so constructed and arranged as to be easily and quickly removable from the assembly and replaced by other units of greater or lesser strength. For this purpose, the bores through the enlarged part 122 of the hub portion 102 freely receive the members 120 and 121 and in the particular construction shown in FIG. 1, a cover arm 126 is employed which has a central opening encompassing the reduced outer extremity 127 of the hub portion 102 and which extends parallel to the torque arm 128 which is integral with the hub portion 102 as is clearly shown in FIG. 1. Both the torque arm 128 and the cover arm 126 are fixed at their outer extrmity by means of a bolt 129 to a suitable retaining clip 130 extending around a frame portion 131 of the sulky so as to prevent rotation of the hub portion 102. As is shown most clearly in FIGS.

2 and 3, the cover arm 126 is provided with diametrically opposed slot portions 132 and 133 merging with semi-circular notches 134 and 135 respectively. The slots 132 and 133 are of such dimensions as to engage the reduced portions 136 of the outer ends of the assemblies 120 and 121, see particularly FIG. 1 but will not pass the largest diameter portions thereof. However, when the bolt 129 is removed and the cover arm 126 rotated slightly so that the notches 134 and 135 align with the members 120 and 121, the latter may be withdrawn and replaced by other units. In order to make withdrawal of the units 120 and 121 easier and so as to obtain a unitary assembly of predetermined frictional drag characteristics, the two assemblies may be interconnected by a retaining clip member 137 of generally C-shaped configuration and which may bear indicia 138 thereon corresponding to its relative spring strength for handicapping purposes. The opposite ends of the clip 137 are apertured to receive portions 139 of members 120 and 121 therethrough and the members are headed over as at 140 serving to fix them to the clip. FIG. 3 illustrates the assembly with the retaining clip removed and showing the relative relationship of the portions 132–135 inclusive.

Figure 4:
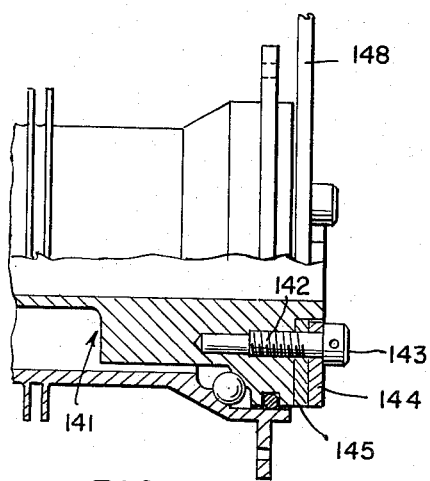
FIG. 4 illustrates a modified form of brake arm utilized with the internal friction type of handicapping device illustrated generally in FIG. 1.
Figure 5:
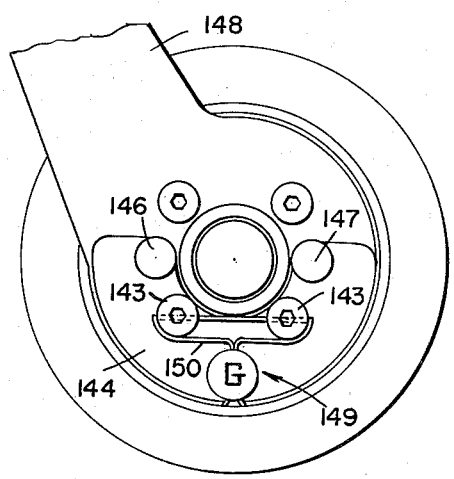
FIG. 5 is a side elevational view of the assembly shown in FIG. 4.

Referring now more particularly to FIGS. 4 and 5, a slightly modified form of construction is shown similar to that shown in FIG. 1. In FIGS. 4 and 5, however, the member 141 corresponds to the member 102 in FIG. 1 and it is provided with a series of circumferentially spaced tapped holes such as that indicated by the reference character 142 for receiving the retaining bolts 143. These retaining bolts project through an outer retaining cover plate 144 corresponding to clip member 137 of FIG. 1 and bear against the retaining clip 145 therebeneath. In FIG. 5, reference numerals 146 and 147 are the pressure applying assemblies corresponding to assemblies 120 and 121 and in this particular construction, no cover arm such as is shown in FIG. 1 is used, reference character 148 illustrating the single torque arm used which corresponds to 128 of FIG. 1.

FIG. 5 also illustrates a seal assembly indicated generally by the reference character 149 which may be of generally conventional construction and which may have its wire portion 150 threaded through openings provided in the two retaining bolts 143 and serving to prevent tampering and unauthorized removal of the handicapping means.

We claim:

1. In combination, a horse racing sulky having wheels, and handicapping means carried by said sulky for maintaining a set predetermined, selectively variable resistance to the rotation of the wheels and movement of the sulky, said handicapping means comprising a wheel hub casing having a plurality of internal splines, an axle member rotatably supporting said hub and having external splines, brake disc elements surrounding said axle member and alternately engaged with the splines of said axle member and said hub casing, and means carried by said axle member for constantly urging said brake discs together to produce a constant and predetermined frictional drag upon an associated sulky wheel.

2. A handicapping assemblage for sulky racing comprising a sulky having a frame and wheels rotatably supporting the frame, and means mounted on said frame in operative engagement with said wheels for applying and maintaining a set predetermined frictional drag upon the wheels as they are turned, said means comprising a casing forming the hub for one of said sulky wheels, an axle rotatably supporting said casing, a plurality of contiguous brake discs alternately nonrotatably carried by said axle and said casing, and means carried by said axle maintaining said discs in engagement with each other to impose a predetermined drag upon said sulky wheel.

3. In combination, a horse racing sulky having wheels, and handicapping means carried by said sulky for maintaining a set predetermined, selectively variable resistance to the rotation of the wheels and movement of the sulky, said handicapping means embodying a wheel hub portion, a shell portion encasing said hub portion and connected to the rim of the wheel to turn therewith around the hub portion, opposing coacting relatively movable friction members carried respectively by said hub portion and said shell portion, and a tensioning means of predetermined strength carried by one of said portions and maintaining said friction members constantly in frictional engagement with one another.

4. The invention according to claim 3, wherein at least one of said friction members is in the form of a flat annulus encircling the wheel hub portion.

5. The invention according to claim 3, wherein said tensioning means embodies at least one coil spring supported with its axis parallel with the axis of the wheel hub portion, means supporting said spring under tension for application of thrust against said friction members, and means for changing the thrust force applied against said friction members.

6. The invention according to claim 3, wherein said hub portion is formed in one end portion of enlarged overall diameter and has at least two axially extending chambers formed therein, said chambers having the inner and outer ends open and having their inner ends directed toward said friction members, and said tensioning means comprises a removable unit in each of said chambers, each of which units embodies a casing having a closed outer end and an inner end provided with an axial opening, a spring housed under tension in the casing, a plunger in the inner end of the casing against which the adjacent tensioned spring bears and a connecting means between the plunger and an adjacent one of the friction members through which thrust is applied to the friction members.

7. The invention according to claim 6, wherein the said closed outer end portion of each of said casings carries a reduced axial extension, a cover arm positioned against the end of the hub portion in which said chambers are formed and adapted for turning movement on the axis of the hub portion, means for effecting a locking engagement between the cover arm and said reduced extensions of the casings, said last means being constructed and arranged to release the said removable units upon a predetermined rotation of the arm about said axis, and means for securing the arm against such rotation.

8. The method of handicapping a wheeled sulky which comprises imposing a fixed frictional resistance upon and to a part of a wheel of the sulky and maintaining said frictional resistance substantially constant throughout the period during which the sulky is being drawn in a race.

References Cited in the file of this patent

UNITED STATES PATENTS

| | | |
|---|---|---|
| 343,484 | McKeon | June 8, 1886 |
| 767,299 | MacDonald et al. | Aug. 9, 1904 |
| 815,841 | Lupham | Mar. 20, 1906 |
| 849,302 | Whelchel | Apr. 2, 1907 |
| 1,163,264 | Rutzen | Dec. 7, 1915 |
| 1,303,734 | Smythe | May 13, 1919 |
| 1,592,182 | Davidson et al. | July 13, 1926 |
| 2,249,297 | Muffett | July 15, 1941 |
| 2,260,189 | Morrison | Oct. 21, 1941 |
| 2,306,845 | Sherman et al. | Dec. 29, 1942 |
| 2,884,096 | Truemper | Apr. 28, 1959 |
| 2,892,514 | Gaines et al. | June 30, 1959 |